United States Patent [19]

Dean et al.

[11] Patent Number: 4,619,356
[45] Date of Patent: Oct. 28, 1986

[54] PROGRAMMABLE PARTS FEEDER

[75] Inventors: Arthur L. Dean, Indiana; William R. Brown; James P. Martin, both of Blairsville; Stanley P. Turcheck, Jr., Ligonier; Junius D. Scott, Homer City, all of Pa.; John D. Gotal, Bristol, R.I.

[73] Assignee: FMC Corporation, Chicago, Ill.

[21] Appl. No.: 641,139

[22] Filed: Aug. 15, 1984

[51] Int. Cl.[4] .............................................. B65G 47/24
[52] U.S. Cl. ................................... 198/395; 198/399; 221/171; 414/224
[58] Field of Search ............... 198/376, 379, 382, 394, 198/395, 398, 399, 401, 410, 412; 414/224, 764, 765, 776; 221/171

[56] References Cited

U.S. PATENT DOCUMENTS 3,319,761  5/1967  Aiken et al. ........................... 198/398
3,447,662  6/1969  House .................................... 198/395

FOREIGN PATENT DOCUMENTS 56-56413  5/1981  Japan .................................... 198/376
56-82716  7/1981  Japan .................................... 198/395
57-62112  4/1982  Japan .................................... 198/399

Primary Examiner—Joseph E. Valenza
Assistant Examiner—Jonathan D. Holmes
Attorney, Agent, or Firm—Douglas W. Rudy; Richard B. Megley

[57] ABSTRACT

A programmable parts reorienter and feeder utilizing a fiber-optic array in a sensing head to determine an initial orientation of a part passing through a parts handling unit. The sensing head is coupled to a microprocessor that has been programmed to recognize properly oriented as well as misoriented parts. After determining the initial orientation of the part the microprocessor will direct a reorienter device to either pass the part in the first orientation, orient the part to a preferred orientation or, in some cases, reject the part.

9 Claims, 7 Drawing Figures

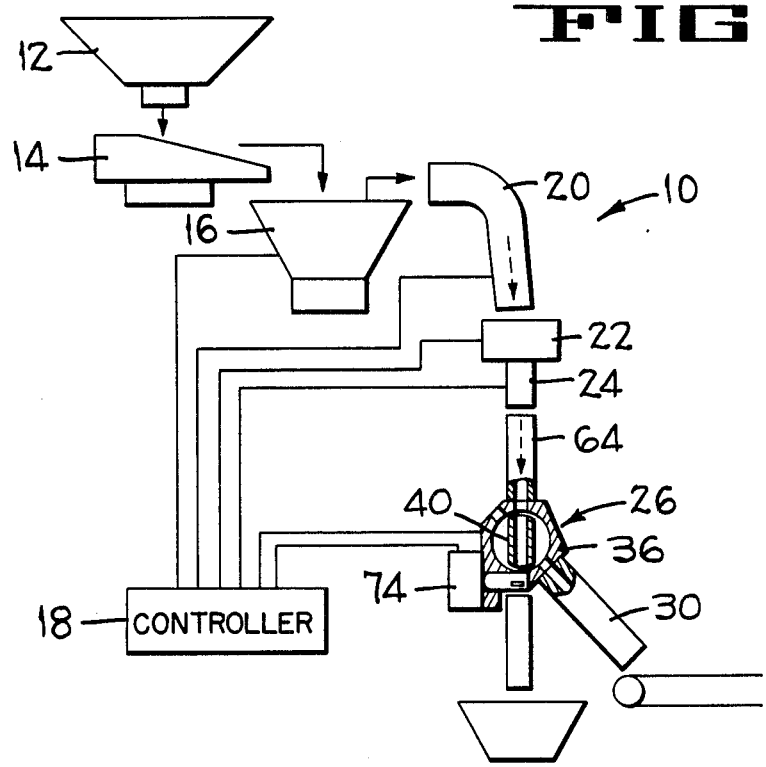
FIG_1
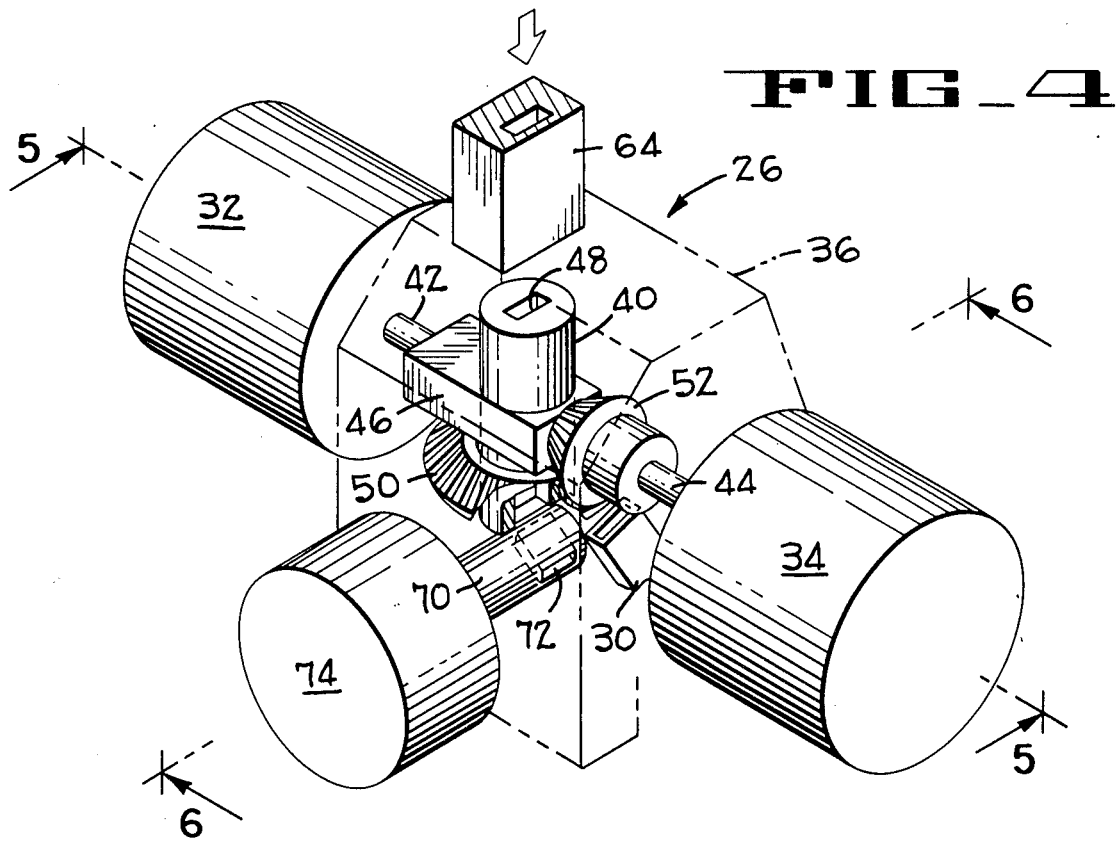
FIG_4

FIG_2
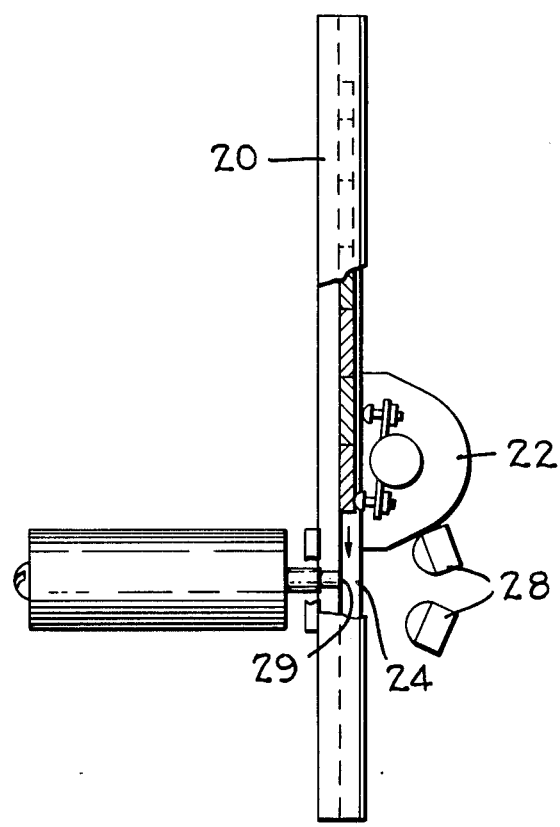
FIG_3
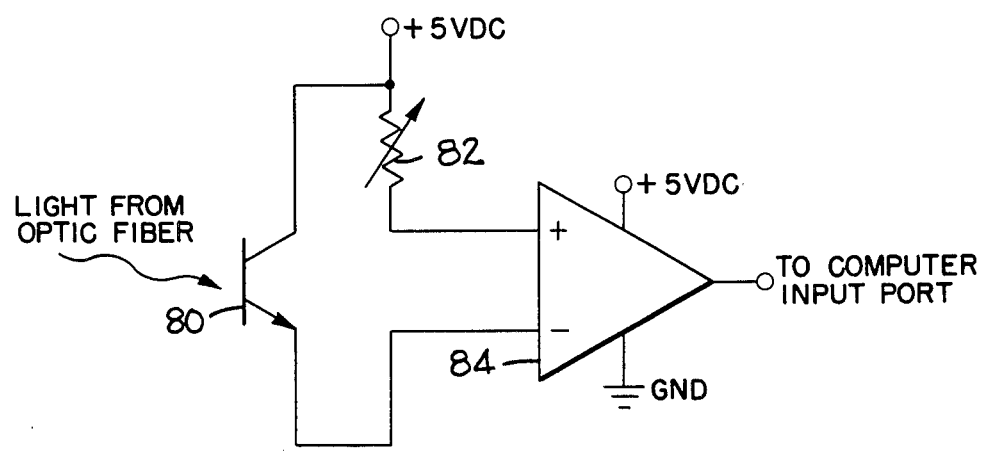

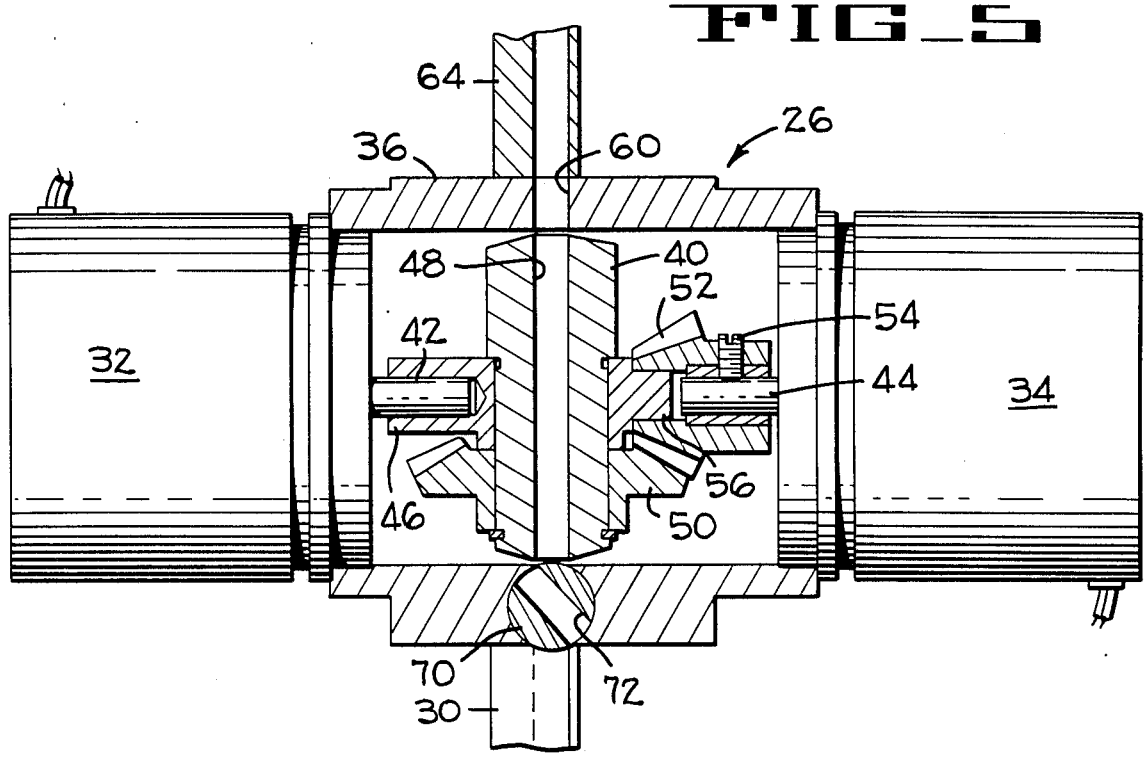
FIG_5
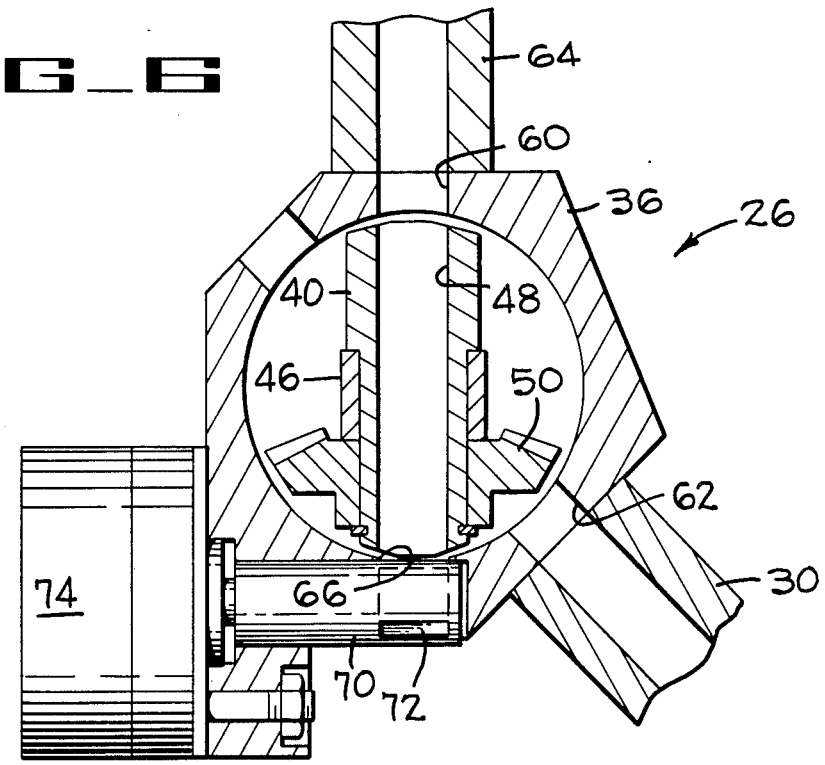
FIG_6

PROGRAMMABLE PARTS FEEDER

A programmable parts reorienter and feeder utilizes a fiber-optic array in a sensing head to determine an initial orientation of a part passing through a parts handling unit. The sensing head is coupled to a microprocessor that has been programmed to recognize properly oriented as well as misoriented parts. After determining the initial orientation of the part the microprocessor will direct a reorienter device to either pass the part in the first orientation, orient the part to a preferred orientation or, in some cases, reject the part.

The microprocessor has been programmed with the ability to "learn" to distinguish multiple orientations of parts and in a run mode can then make part orientation determinations based on its "learned" information.

The operating principles of this invention will be understood through a careful review of this specification when read in conjunction with the drawing figures wherein:

FIG. 1 is a pictorial representation showing the path that a part to be oriented would follow;

FIG. 2 is a side elevation view of an optical scanning device and singulating mechanism with portions broken away to reveal parts in the mechanism;

FIG. 3 is a schematic of a preferred embodiment of the optical scanning device;

FIG. 4 is a perspective view of a parts orienter with the body of the housing removed to show the internal arrangement;

FIG. 5 is a sectional view through 5—5 of FIG. 4; and

FIG. 6 is a partially sectioned view through 6—6 of FIG. 4.

Figure 7:
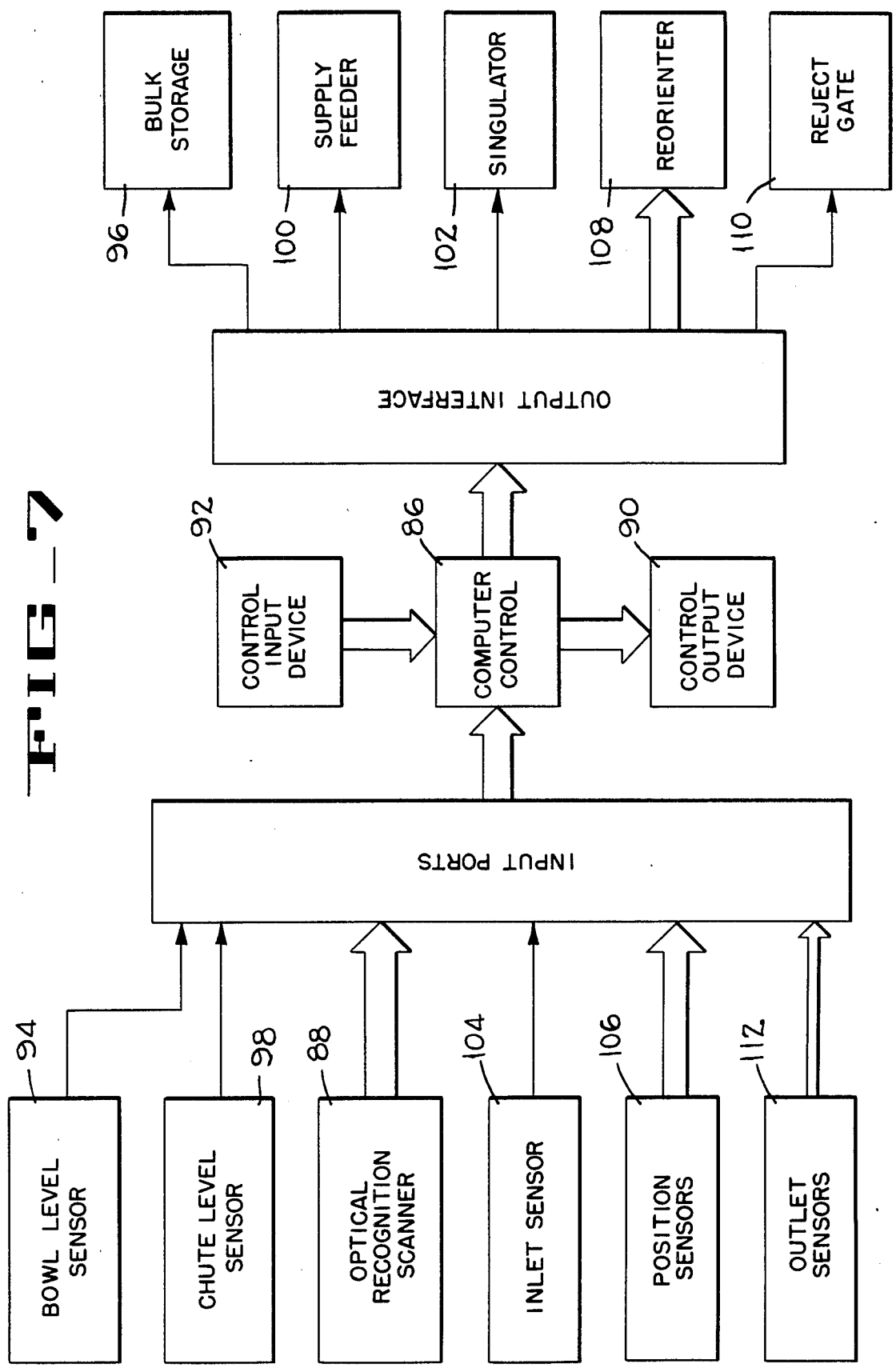
FIG. 7 is a block diagram of the computer control system.

Looking at FIG. 1 the path that a part to be oriented may follow is shown by the simplified diagrammatic sketch. In a possible embodiment the part reorientation system generally 10 has a hopper 12 in which bulk quantities of small parts are received and stored. The hopper 12 is unloaded through the use of a bulk delivery feeder 14 that may be cycled on an off to supply a feeder bowl 16.

The feeder bowl 16 may be a vibratory feeder that provides a stream of single small parts by unloading the bowl from the bottom to the top. The parts are delivered to the chute 20 where they are held in a queue by a singulator 22. The singulator 22 may be a solenoid operated brake that will release only a single part while holding subsequent parts in the queue.

As shown more clearly in FIG. 2, the singulator 22 will release one part at a time, such part will then free-fall through a scanning zone 24. The scanning zone 24 is equipped with a fiber-optic array composed of a plurality of fiber-optic fibers arranged in single file. A light source 28 is provided in the scanning zone to illuminate the optic fibers not shown but have their input ends at 29.

In a preferred embodiment, dual light sources are mounted opposing the fiber-optic array. The mounting angles of the light sources may be adjustable to provide an elongated shadow mode of operation that allows for optimum sensing of the different orientations of the part being sensed. A light source may also be provided to bounce light off the part being sensed from the same side of the scanner as the detector array. Fiber-optic fibers may be utilized for this light source. This would allow retro-reflective or specular reflective detection. Strobing or pulsing the light source at various levels of intensity may be desirable for optimum sensing.

In FIG. 3, the photo transistor 80, potentiometer 82, and operational amplifier 84 convert the optical information from the optic fibers to digital signals for use by the computer control.

The typical configuration of the optical recognition devices may consist of sixteen sensor interface circuits although alternative quantities of sensor interface circuits are contemplated.

A reorienter, generally 26 is located downstream of the scanning zone 24 and is responsive to signals it receives from a processor or computer 18.

Parts are reoriented in the reorienter 26 as necessary and discharged to a discharge port or reoriented part chute 30.

A simple reorienter may be utilized wherein the reorienter has an object receiving means and a plurality of object discharging means that can be selectively indexed responsive to the processor after the processor has processed recognition information received from the scanner.

In a preferred embodiment the reorienter is also equipped with a reject mechanism comprising a reject gate operated by a solenoid which will allow rejection of parts with undetermined orientation through the reject mechanism port 72.

Turning now to the detailed drawings of the reorienter, FIGS. 4–6 can be considered together as like numbers represent this same part in each figure.

In FIG. 4 a pair of motion inducing means such as stepping motors, first step motor 32 and second motor 34, are mounted in opposed but aligned positions to the reorienter housing 36. The housing 36 has a generally cylindrical interior cavity containing a rotor 40 having a longitudinal bore 48 therethrough.

The rotor 40 is carried and supported through its lateral axis by the bearing yoke 46 driven by the output shafts 42 and 44 of the first 32 and second 34 stepping motors respectively. The first motor output shaft 42 is securely fastened into a bearing yoke 46 carried annularly on the exterior of the rotor 40. The rotor 40 is freely rotatable in the bearing yoke 46.

Also carried on the rotor 40 is a bevel gear 50 keyed to the rotor so it cannot freely rotate on the rotor A second motor shaft 44 is provided with a pinion gear 52 which is securely fastened to the second motor shaft 44 by an appropriate means. In the embodiment shown a set screw 54 is used to hold the pinion gear 52 on the motor shaft 44. The pinion gear 52 is positioned to engage the bevel gear 50. It is also supported on the bearing yoke 46 through means provided by the bearing yoke 46 stub shaft 56.

The bevel gear and pinion gear elements are preferred embodiments of first and second drive means which are contemplated by the inventors to be other drive arrangements such as, for instance, a disk and friction wheel drive assembly.

The housing 36 is equipped with at least two access apertures including a port 60 and a primary discharge port 62. The loading port 60 is permanently aligned with a loading track 64 for delivery of parts from the scanning zone to the part reorienter system. The primary discharge port 62 is aligned with the reoriented parts chute 30.

A secondary discharge port 66 may be formed in the housing 36. This secondary discharge port 66 may include a reject gate apparatus formed by a rotary shaft 70 provided with a reject port 72 therein. The reject gate apparatus may also include a rotary solenoid 74 connected to the rotary shaft 70 for movement of the shaft from a open position to a closed position.

In a closed position the rotary shaft 70 will seal the secondary discharge port 66 trapping a part in the longitudinal bore 48 until upon the command of the microprocessor controller 18 the reorienter reorientates the part and releases the part from the reorienter through the primary discharge port 66. The rotary shaft 70 can be rotated to an open position by the rotary solenoid 74 to allow passage of a part from the bore 48 of the rotor through port 72 when the part is rejected by the microprocessor controller 18.

In operation, a preferred embodiment of the invention will receive parts from the feeder bowl 16 in single file but randomly oriented into the gravity chute or track 20. The chute 20 is equipped with an escapement such as singulator 22 which is shown in FIG. 2. As parts are released one at a time from the singulator they will fall, in this embodiment by gravity, past a scanning zone 24 where orientation of each individual part is detected.

In a preferred embodiment the optical recognition device's signal is repeatedly sampled by the controller (18) as the part passes through the scanning zone (24). These samples are accumulated and processed typically as a 64×16 element picture. Comparison of this picture with the learned data base stored in the computer memory determines the part orientation while the part continues its passage down the chute and into the longitudinal bore 48 of the rotor 40.

At this stage in the reorientation process the stepping motors are in a first or load position identified to the motors by feedback encoders. The first position will be the arbitrary starting position for this explanation.

The controller 18, having been fed with information from the fiber-optic scanner, will compare the information received from the scanner and categorize the part as being within one of four possible orientations or in an unrecognized orientation. The controller 18 will then alternately pulse the phase windings of the stepping motors, each as necessary, to rotate the rotor through a programmed cycle selected by the controller to reorient the part and release it into the reoriented part chute 30 and return the now vacated rotor to the first position for accepting the next part.

One of the programmed reorienting cycles is selected by the controller and the reorienter is then cycled through the correct reorienting cycle. If a part must be turned about its longitudinal axis, the stepping motor 34 is pulsed to rotate the rotor about its longitudinal axis and then both motors are pulsed to rotate the rotor about its lateral axis from the loading port to the discharge port. After the part enters the discharge track both motors are pulsed to return the empty rotor to the loading port.

In a second situation when a part has to be turned about its lateral axis to reorient it, both motors are pulsed to rotate the rotor about the axis of the motors so that the part is turned about its lateral axis and the part is then released into the discharge port 66. Both motors are then pulsed to return the empty rotor to the loading port 62.

In the third situation, when a part must be turned about both axes to reorient it, the stepping motor 34 which drives the gear train 50 and 52 rotates the rotor 48 about its longitudinal axis and then both motors rotate to turn the part about its lateral axis and subsequently release the part into the discharge port 66. The rotor is then returned to the loading port 62 by pulsing both motors.

The fourth possible orientation that a part could assume is when the part enters the rotor properly oriented. In this situation both motors are pulsed to rotate the rotor to the discharge port. After the part falls into the discharge track both motors return the empty rotor to the loading port.

In the first and third reorienting cycles the operation of both motors during the reorienting cycles may be programmed to rotate the motors simultaneously about both the longitudinal axis and lateral axis to reduce the cycle time.

The reject apparatus comes into play when the controller 18 cannot determine the orientation of a part after the part is released from the singulator. It will also be utilized when a part is not recognized by the scanner because the part is not within the tolerances that have been taught to the scanner controller 18. In this case the part is rejected by the solenoid operated gate 72 located on the center line of the loading port 62 below the rotor 48 in the orienter housing.

FIG. 7 shows a block diagram of the computer control system. The controller (86) continuously sets the rate of parts being fed, recognized, and reoriented or rejected as determined by its control inputs, sensor inputs, and programming.

In a preferred embodiment, a human operator could "teach" the computer control the possible orientations that parts to be fed could have and the corrective actions necessary to reorient for uniform orientations delivered to the serving queue. The computer would "learn" the allowable tolerances from differing readings from the optical scanner (88) of the same orientation. The information on each orientation would then become the learned data base by which the computer can discriminate between orientations.

Once the computer "understands" the chosen part or parts, the human operator, in a preferred embodiment of the invention, chooses the desired result of the system's manipulation of the random parts. The human operator may choose to have the system deliver the parts all in one orientation or deliver a particular sequence of orientations or expell wholly different parts in two or more directions. In a typical arrangement a human operator would be prompted by the control output display (90) and would enter commands via a control input device (92).

The bowl level sensor (94) signals to the computer (86) so that it may control the bulk storage feeder (96). The chute level sensor (98) signals to the computer so that it may control the supply feeder (100). The computer energizes the singulator (102) such that a part will fall past the recognition sensor (88) which relays its information about the parts orientation to the computer. The computer can check the reorienter's inlet sensor (104) and issue an error message if the part did not successfully enter the reorienter. The position sensors (106) allow the computer to align the rotor (40) for loading. The computer can signal the reorienting mechanism (108) or reject mechanism (110) to produce the desired discharge of the part. The computer can also check the reorienter's outlet sensors (112) and issue error messages if the part did successfully exit the reorienter.

Thus it can be seen that a flexible parts reorienting system, that can be programmed to selectively reorient, sequence or sort parts in a desired manner from randomly oriented parts delivered to it, has been provided by this disclosure.

Various nuances of design and modifications falling within the broad scope of the following claims are contemplated by the inventors.

We claim:

1. A part reorienter system is provided with a reorienter means comprising:
   a housing having a cylindrical interior cavity with a plurality of ports including a first and a second port extending through said housing to said interior cavity;
   a rotor carried in said cylindrical interior cavity, said rotor having a through bore extending longitudinaly therethrough;
   a bearing yoke carried annularly on said rotor;
   a first motion inducing means attached to said bearing yoke;
   a first drive means integral with said rotor;
   a second drive means in engagement with said first drive means;
   a second motion inducing means connected to said second drive means whereby said rotor may be sequentially aligned with said first and said second ports through activation of said first and second motion inducing means.

2. The invention in accordance with claim 1 further comprising; a rotary shaft carried in said housing, said shaft having an aperture transversely therethrough, said aperture aligned with said through bore of said rotor and a third motion inducing means connected to said rotary shaft.

3. The invention in accordance with claim 2 further comprising; a third port formed in said housing between said rotary shaft and the interior of said housing, said rotary shaft aperture alignable with said third port, rotary shaft closing said third port when said transverse aperture therein is misaligned with said third port.

4. The invention in accordance with claim 3 further comprising; said first motion inducing means is a stepping motor having an output shaft attached to said bearing yoke and said second motion inducing means is a stepping motor having an output shaft connected to said second drive means.

5. The invention in accordance with claim 4 wherein said first and second drive means comprise a bevel gear and a pinion gear respectively.

6. A reorienter system orienting objects randomly served through a delivery means to said reorienter from a bulk storage means containing said objects comprising:
   processor means for inputting, processing and outputting data from and to said reorienter system for controlling said reorienter device;
   singulator means interposed in said delivery means for individual object release of objects served to said singulator means from said bulk storage means;
   scanning means interposed in said delivery means downstream from said singulator means, said scanning means providing data to said processor means for the determination of a first orientation of said objects; and
   reorientor means having a rotor through bore, said rotor supported in a cylindrical housing having at least two access apertures, one aperture being a port aligned with said delivery means and said through bore, said rotor being rotatable in a bearing yoke carried annularly on the exterior of said rotor with said bearing yoke attached to a first stepping motor output shaft, said rotor also being integral with a bevel gear capable of being driven by a second stepping motor having a pinion gear attached to a second stepping motor output shaft, thereby said reorienter means will orient said objects after said objects are delivered to said through bore responsive to processor means after said processor has received data from said scanner means.

7. The invention in accordance with claim 6 wherein said reorienter means includes a secondary discharge port having a reject gate apparatus comprising a rotary shaft provided with a reject port therein.

8. Invention in accordance with claim 6 said scanning means comprises:
   a fiber-optic array composed of a plurality of fiber-optic fibers in a single file transverse to said delivery means;
   a light source to provide illumination to said optic fiber;
   a light detector means to convert said optical information from said optic fiber to digital signals.

9. The invention in accordance with claim 8 wherein said fiber-optic array comprises fiber-optic fibers used as light source means or light detector means, said fibers adjacent to said single file fibers.

* * * * *